Figure 9:
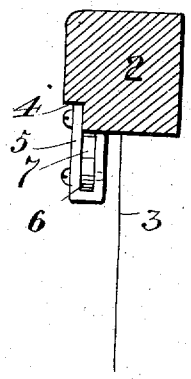

No. 12,082.

REISSUED FEB. 17, 1903.

F. BARLET, DEC'D.

W. T. P. HOLLINGSWORTH, ASSIGNEE.

LOOM.

APPLICATION FILED JAN. 21, 1903.

5 SHEETS—SHEET 1.

Witnesses
Franck L. Orinand
E. E. Leacock

Frederic Barlet dec'd
Inventor
W. T. P. Hollingsworth
Assignee
by Marcellus Bailey
his Attorney.

No. 12,082. REISSUED FEB. 17, 1903.
F. BARLET, DEC'D.
W. T. P. HOLLINGSWORTH, ASSIGNEE.
LOOM.
APPLICATION FILED JAN. 21, 1903.
5 SHEETS—SHEET 2.
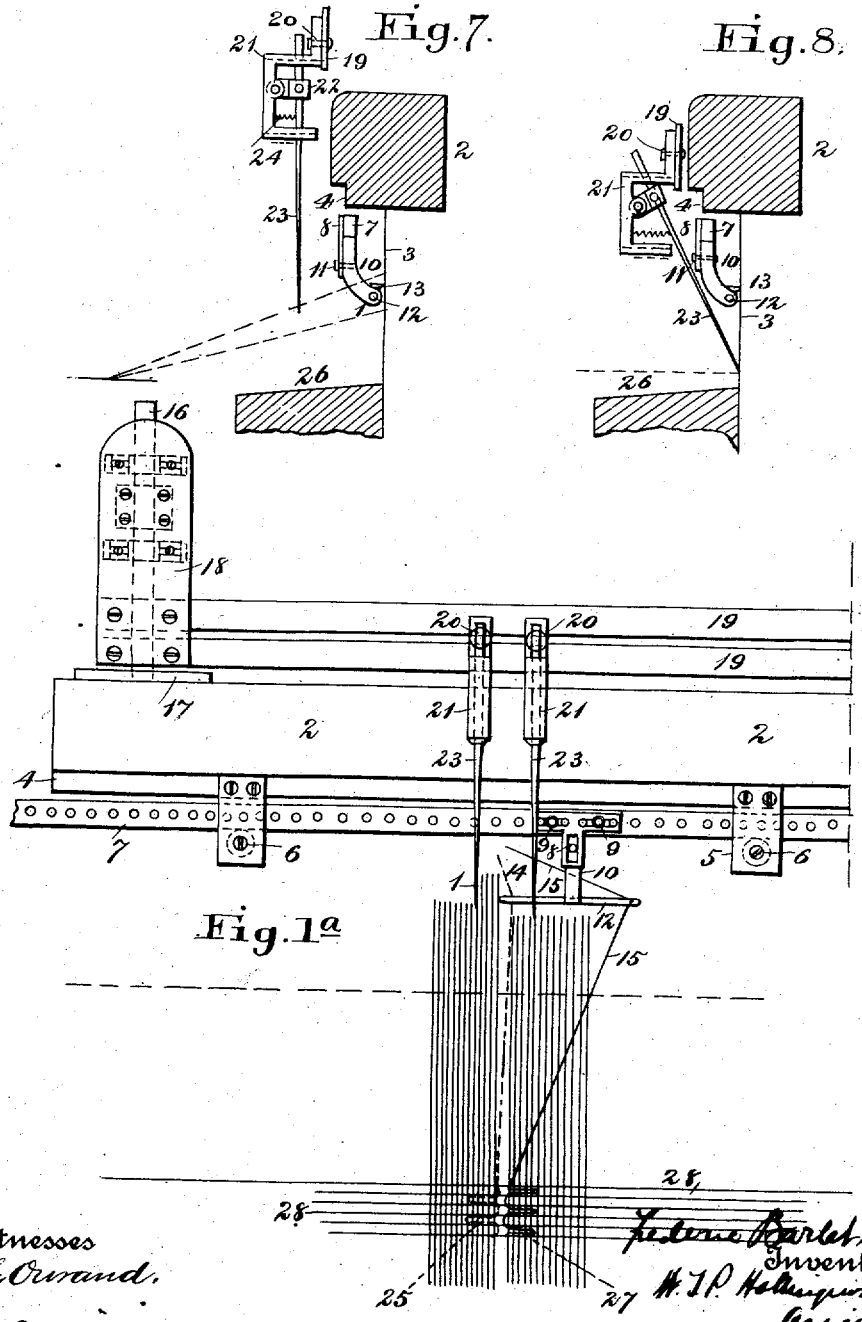
Witnesses
F. L. Ormand.
Everett Wise
Frederic Barlet dec'd
Inventor
W. T. P. Hollingsworth
Assignee
by Marcellus Bailey
his Attorney.

No. 12,082. REISSUED FEB. 17, 1903.

F. BARLET, DEC'D.

W. T. P. HOLLINGSWORTH, ASSIGNEE.

LOOM.

APPLICATION FILED JAN. 21, 1903.

6 SHEETS—SHEET 3.

Witnesses
F. L. Ourand
Ewell & Orik

Frederic Barlet dec'd
Inventor
W. T. P. Hollingsworth
assignee
by Albert Bailey
his Attorney No. 12,082. REISSUED FEB. 17, 1903.

F. BARLET, DEC'D.

W. T. P. HOLLINGSWORTH, ASSIGNEE.

LOOM.

APPLICATION FILED JAN. 21, 1903.

5 SHEETS—SHEET 4.

Witnesses
F. L. Durand.
[illegible]

Frederic Barlet dec'd
Inventor
W. T. P. Hollingsworth
Assignee
by [illegible]
his Attorney No. 12,082. REISSUED FEB. 17, 1903.

F. BARLET, DEC'D.

W. T. P. HOLLINGSWORTH, ASSIGNEE.

LOOM.

APPLICATION FILED JAN. 21, 1903.

5 SHEETS—SHEET 5.

Witnesses
F. L. Ormand.
Ernest Ring

Federic Barlet dec'd
Inventor
W. T. P. Hollingsworth
Assignee
By Marcellus Daily
his Attorney

UNITED STATES PATENT OFFICE.

WILLIAM T. P. HOLLINGSWORTH, OF NEW YORK, N. Y., ASSIGNEE OF FRÉDÉRIC BARLET, DECEASED.

LOOM.

SPECIFICATION forming part of Reissued Letters Patent No. 12,082, dated February 17, 1903.

Original No. 706,376, dated August 5, 1902. Application for reissue filed January 21, 1903. Serial No. 140,037.

*To all whom it may concern:*

Be it known that FRÉDÉRIC BARLET, late a citizen of the Republic of France, and a resident of St. Etienne, Loire, in the Republic of France, did during his lifetime invent a certain new and useful Improvement in Looms, of which the following is a specification.

This invention relates to an apparatus capable of application to and use in connection with any type of shuttle-loom for the purpose of weaving in the middle of a fabric selvages which will not unravel. This permits the selvages of twin fabrics or ribbons—that is to say, two or more fabrics or ribbons woven simultaneously side by side by the same ground-shuttle—having given to them the same appearance and solidity as the selvages of cloths or ribbons woven separately, the selvages being woven simultaneously with the fabric.

Instead of selvages the apparatus may be used for weaving fancy or figured strips of various widths concurrently and simultaneously with the throw of the ground shuttle or shuttles.

The apparatus consists, essentially, of a horizontally-reciprocating needle and a vertically-reciprocating needle, both of which are mounted on and move with the batten or lay of a shuttle-loom, the horizontal needle serving to deposit in a shed formed for that purpose a weft-thread (which may be termed a "selvage-weft thread") in loop form and the vertical needle serving to retain that loop until it is beaten up, said weft-thread being kept continuously under tension by a suitable tension and take-up apparatus. There is thus, in effect, superimposed upon a shuttle-loom a needle-loom. The shuttle is used in the ordinary way to weave the body of the twin fabrics and the exterior opposite selvages of said fabrics, while the needle-loom is used to concurrently weave the interior opposite edges of said fabrics into fast selvages. It is in this combination of a needle-loom and a shuttle-loom whereby a fast selvage in the middle of a fabric is produced that the invention mainly consists. Each of these instrumentalities separately considered is old and well known; but it is believed their combination in one and the same loom has never before been proposed, and said combination, as above indicated, permits a new industrial result to be obtained.

In the accompanying drawings, to which reference will now be made, the tension and take-up devices for the selvage-weft and the mechanism for actuating the vertical and horizontal needles are not represented, because these are well known to those skilled in the art to which the invention relates and are unnecessary to an understanding of the invention.

Figure 1:
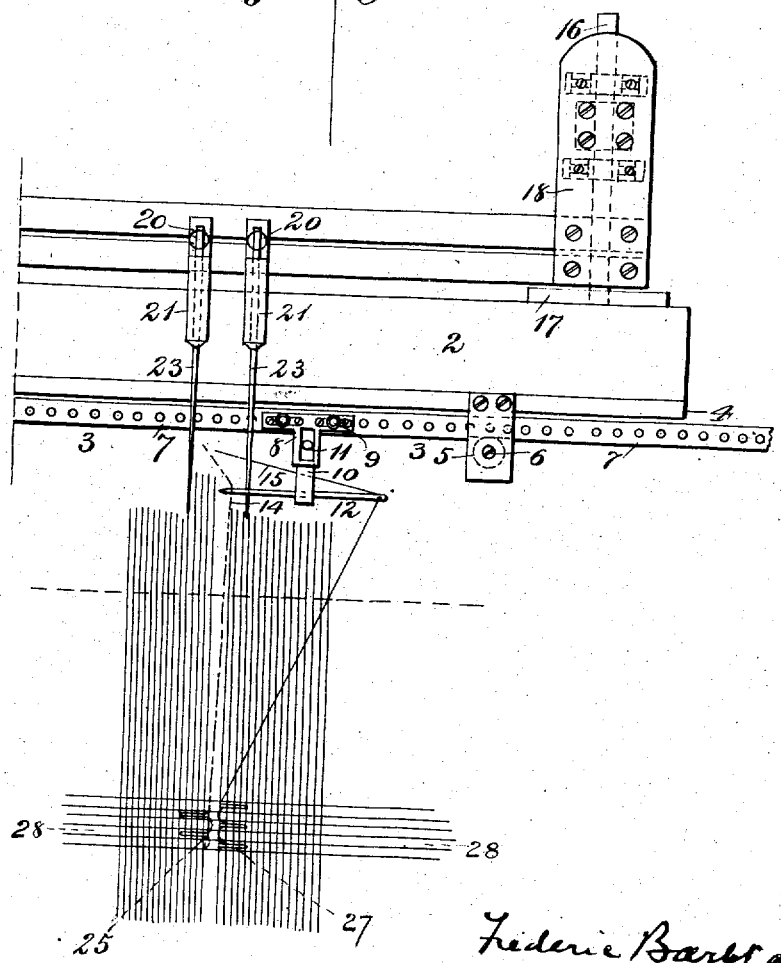
Figure 2:
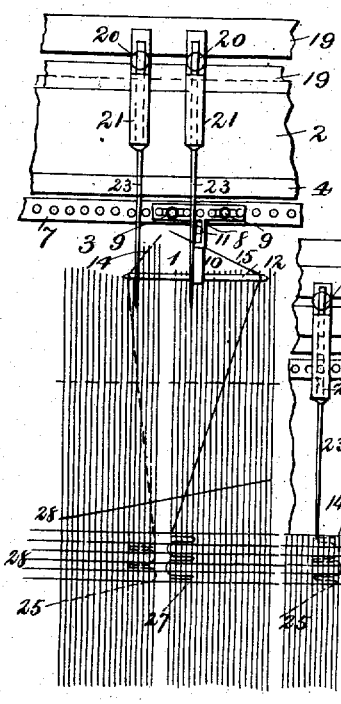
Figure 3:
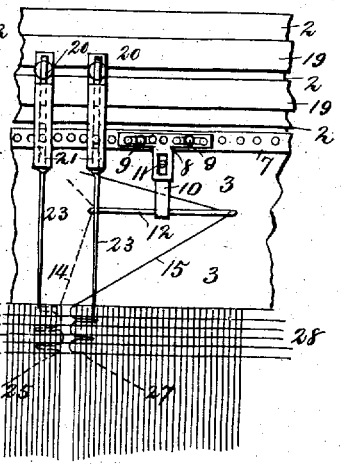
Figure 6A:
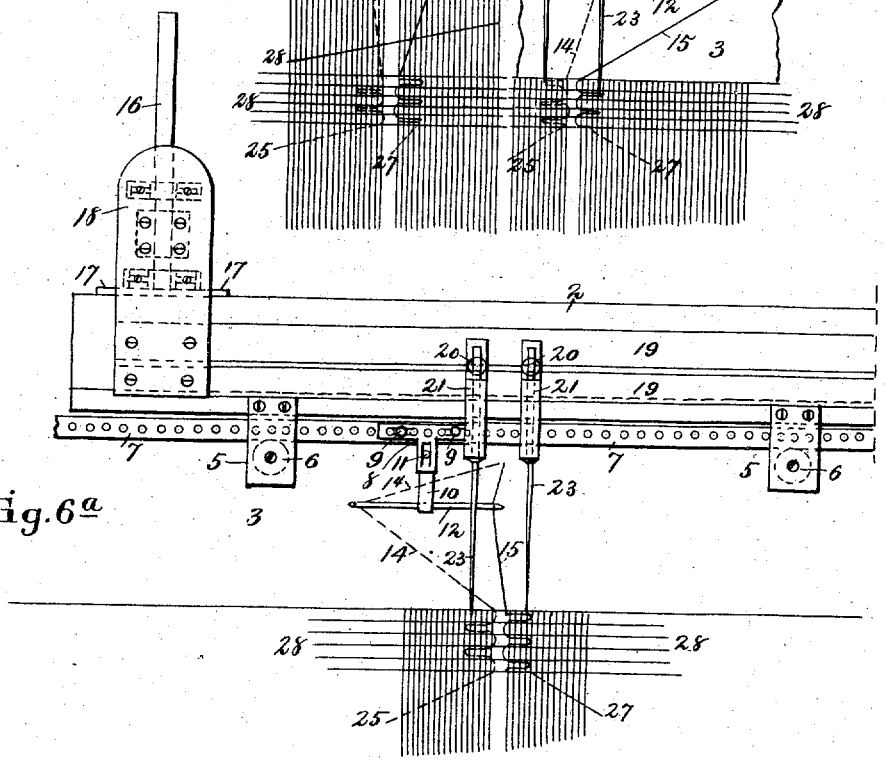
Figure 4:
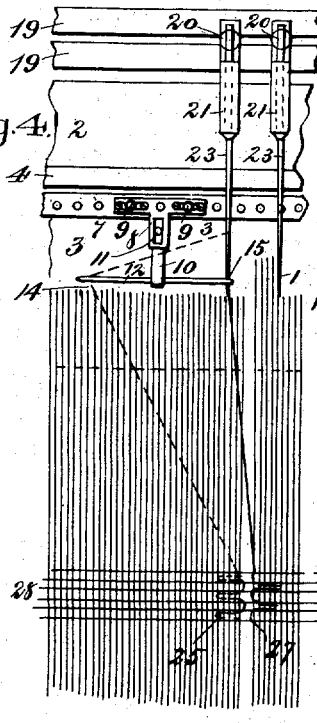
Figure 5:
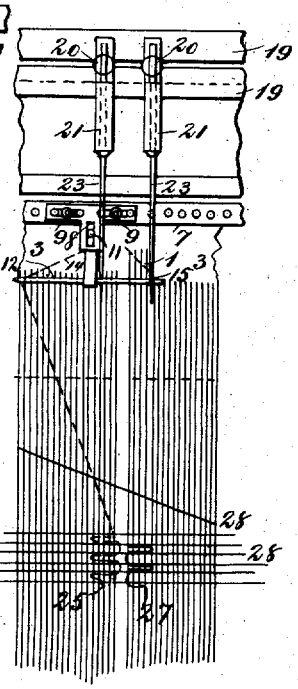
Figure 6:
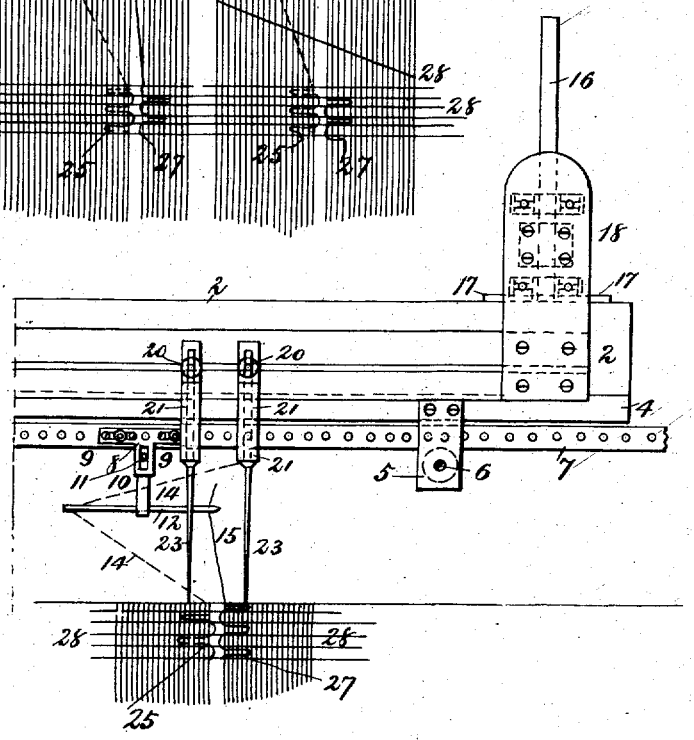
Figure 10:
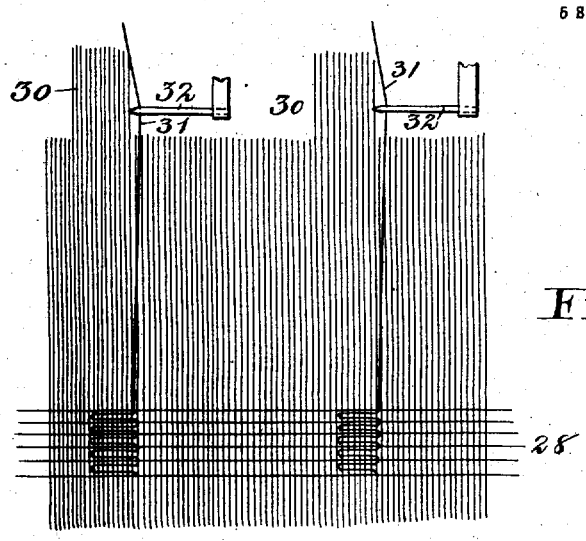
Figure 11:
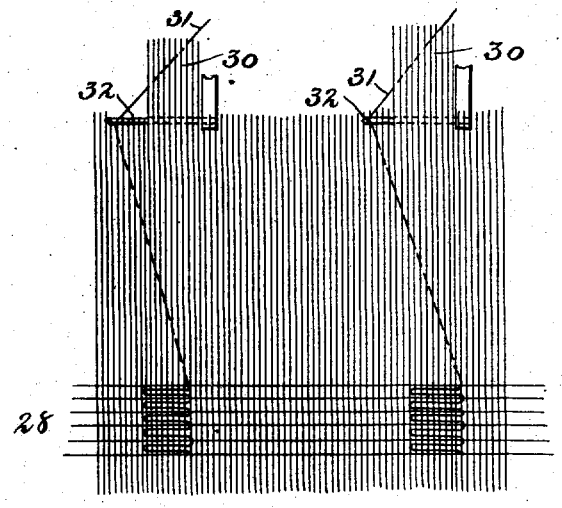
Figure 12:
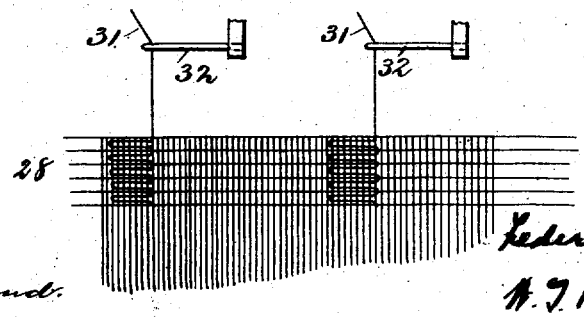

In the drawings, Figures 1, $1^a$ is a face view of so much of a shuttle-loom as needed to illustrate the invention. Fig. 1 is a view of the right-hand portion, and Fig. $1^a$ is a view of the left-hand portion, of one and the same batten, together with the needle apparatus carried thereby, the parts being in the position they occupy when the batten is in its back position and the sheds are open. In this figure, as in the others, the warp and weft threads and the sheds are represented diagrammatically. The central unfilled space between the two sets of warps at each reed represents the line of division between the twin fabrics, the interior opposite edges 25 27 of which are formed with fast selvages by the aid of the needle apparatus. Figs. 2, 3, 4, 5 represent the positions successively assumed by the needles after they leave the position they occupy in Fig. 1 and before they reach the position in which they are shown in Fig. 6. Figs. 6, $6^a$ is a face view of the batten and the needle apparatus similar to Figs. 1, $1^a$, but with the parts in the position they occupy when the sheds are closed. Fig. 7 is a side elevation of the batten, showing the needles in the position they occupy in Fig. 1. The diverging dotted lines in this figure represent a shed 1, formed in the top lift of the main or ground-warp shed, at, say, the inner edge 25, by raising at this edge certain of the warps (which I term "taffeta-warps") above the ground-warps in the top lift for the purpose of receiving the loop of selvage-weft. The bottom lift of the main or ground-warp shed is omitted from this figure. Fig. 8 is a side view of the same parts in the position they occupy in Fig. 6. Fig. 9 is a side elevation of a detail illustrative of the guide in which the horizontal needle-carrying bar is supported and reciprocates. Figs. 10, 11, 12 are views of a modification hereinafter referred to.

The batten 2 is the batten of an ordinary silk power shuttle-loom. The reed 3, Figs. 7, 8, is set between the main part 2 of the batten and its lower portion 26 in the usual way.

The warps are arranged as if ordinary twin fabrics were in question—that is to say, several dents in the middle of the reed are left empty, so as to form a line of division between the two sets of warps. These warps—the ground-warps—are of course all operated at the same time to form the shed, and the ground-shuttle which carries the ground-weft passes at each movement from the outer edge of one set of warps to and beyond the outer edge of the other set of warps, just as usual in weaving this class of fabrics, and by this shuttle the exterior opposite selvages of the twin fabrics are formed, as will be understood without further explanation.

The taffeta-warps for the selvage-sheds 1 are threaded through four heddles instead of two in order to form alternately at each of the interior opposite edges 25 27 of the twin fabrics a shed 1 in the upper lift of the ground-warp shed—that is to say, at one beat up to form the shed 1 in the edge 25 and at the next succeeding beat up to form the shed 1 in the edge 27, and so on. This shed 1 may be obtained in various ways, preferably by setting the harness-eyes for the taffeta-warps of the top lift of this auxiliary shed higher than those for the ground-warps in the top lift of the ground-warp shed.

Along the lower edge of the upper portion of the batten is formed a longitudinal rabbet 4, Fig. 9, to receive the legs of guide-brackets 5, which are secured therein by screws. Each bracket contains a pivoted antifriction-roller 6, and the long reciprocating bar 7 passes through the guide-brackets 5 and is supported on said rollers 6. This bar carries the horizontal needle or needles for laying the selvage-weft. The bar 7, preferably of steel, is perforated with holes about two millimeters in diameter and six millimeters apart. T-shaped supports 8, preferably of copper, are fixed to the bar by screw-studs 9, which pass through slots in the horizontal arm of the support and holes in the bar and have small nuts screwed onto their screw-threaded end to firmly clamp the supports to the bar. The slots formed in the horizontal arms of the T-shaped support are about twelve millimeters long, and as the holes in the bar are spaced only six millimeters apart the supports can be applied to and secured to the bar at any point throughout its length, because some portion of each slot must also be opposite to some hole in the bar.

A needle-carrier 10, made of copper, iron, aluminium, or other suitable material, is adjustably fixed to the vertical stem of the T-shaped support 8 by a set-screw 11, which passes through a slot in said vertical stem into a threaded hole in the needle-carrier.

The needle-carrier 10 at its lower end is curved toward the reed (see Figs. 7 and 8) and has formed in this end a tubular passage to receive the horizontal needle 12, which is secured in place therein by a set-screw 13. This needle is a stiff steel needle about one millimeter in diameter. It is fixed by its center to the carrier, so that it protrudes from each side thereof, and each of its ends is slightly pointed and has an eye to receive a thread and is so located that it will be in a plane exactly between the two lifts of the auxiliary shed 1 when the latter is open.

The length of the needle varies with the size of the selvage it is desired to weave. On an average each of its ends in length should exceed by about twelve millimeters the width of the auxiliary shed.

Each end of the needle takes its own weft-thread. These threads are marked 14 and 15, respectively. Each thread is conducted from its spool to the needle and on its way to the latter passes to and through a tension and take-up apparatus. For this purpose it is preferred to make use of the tension and take-up apparatus described and illustrated in the Kuett patent, No. 653,249, of July 10, 1900; but any other known or suitable devices for the purpose can be employed.

The horizontal needle is so located that it will enter and lay a loop of weft-thread in the interior opposite edges 25 27 of the twin fabrics alternately—that is to say, so that at one beat up of the batten one of its ends will lay a loop of the weft-thread 14 in the auxiliary shed 1 in the edge 25 and at the next succeeding beat up the other of its ends will lay a loop of weft-thread 15 in the auxiliary shed 1 in the edge 27, and so on. The reciprocatory movement of the needle for this purpose is derived from the longitudinal sliding bar to which it is attached, said bar being actuated to thus move by a suitable power-driven cam and connections. Mechanism of this kind is well known and in common use and requires no illustration here.

Upon the upper portion of the batten is mounted the vertical reciprocable frame, which carries the vertical needles which are designed to retain and hold the loops of selvage-weft deposited in the edges 25 27 until they are beaten up. This frame, which may be of any suitable construction, consists in this instance of two longitudinal bars 19, bound together by end connecting-plates 18, which are mounted and adapted to slide up and down on standards 16, secured by their feet or bases 17 to the top of the batten. The bars 19 are separated from each other by a space of about three millimeters, forming a longitudinal slot in which the carriers of the vertical needles can be adjustably secured. These needle-carriers 21 (whose construction is fully shown in Figs. 1, 7, and 8) are fixed to the vertically-reciprocating frame by small bolts 20, which pass through the carriers and the slot between the bars 19 and are held in place by nuts on their screw-threaded ends.

Each needle-carrier is approximately E-shaped in side elevation. To its middle limb is pivoted the cube-shaped counterweight 22, through which passes the vertical needle 23, said needle being secured in place therein by a suitable set-screw. The top and bottom horizontal limbs of the E-shaped carrier are slotted for the passage of the needle which projects into them. These slots, which serve as needle-guides, are indicated by dotted lines in Figs. 7 and 8. The slot in the upper limb is closed at both ends. The slot in the lower limb is open at the end next to the batten and is also made a little flaring, so that the vertical needle may readily move out from and return back into the slot as it swings on its pivot to and from the reed 3, a light spiral spring 24 being used to reinforce the action of the counterweight 22 in tending to return the needle to its normal vertical position.

The needle 23 is a long, slim, and consequently flexible needle about twelve millemeters in length and tapered for about one-half of that length. It is shown in raised position in Fig. 7 and in lowered position in Fig. 8. In the latter position it penetrates and extends down through the ground-warp shed between the warps thereof.

A vertical needle is needed for each of the two interior opposite selvages of the twin fabrics, and each is so located that its point will be directly above the inner extremity of its selvage.

In case it is required to weave ribbons having much narrower selvages than herein illustrated it may not be possible to bring the needles 23 near enough together if each has its own carrier. In such case a single carrier with a hinged counterweight 22 of sufficient size to permit the two needles to be mounted in it may be employed. These needles reciprocate up and down with the frame on which they are mounted. When they descend, they serve to retain the loop of additional selvage-weft 14 or 15 until the beat up of the batten, after which they rise, leaving the weft-loop in the fabric, and are ready for a fresh descent. The frame which carries these needles can be actuated by any of the numerous and well-known devices for that purpose employed in needle-looms and too well known for those skilled in the art to require illustration or description here.

The horizontal bar 7, to which the horizontal needles 12, which lay the selvage-weft, are attached, is given six successive different movements necessary for effecting the work—viz., first, about thirty millimeters from right to left, (see Figs. 1 and 2;) second, about thirty millimeters from left to right, (see Figs. 2 and 3;) third, about seventy millimeters from right to left, (see Figs. 3 and 4;) fourth, about thirty millimeters from left to right, (see Figs. 4 and 5;) fifth, about thirty millimeters from right to left, (see Figs. 5 and 6;) sixth, about seventy millimeters from left to right. (See Figs. 6 and 1.) These six movements take place during two complete beats of the lay or batten, and they should be so timed that movements 1, 2, 4, and 5 take place at the moment of raising the warps and movements 3 and 6 at the moment of lowering immediately after the beat of the reed.

The operation is as follows: Suppose the horizontal needle 12 has just finished its sixth movement and is in the position shown in Fig. 1, with its end which carries the auxiliary weft thread 14 several millimeters from the right-hand edge of the warps of selvage 25. The vertical needles 23 are in their raised position. A shed is opened in the warps of the twin fabrics, the shed being of the usual height for the body of the fabrics and for the selvage 27 of the right-hand fabric, but having an additional lift for the threads of the inner selvage 25 of the left-hand fabric, so as to form the auxiliary shed 1, Fig. 7. The shuttle carrying the ground-weft 28 is now thrown through the ground-shed, and simultaneously the horizontal needle makes its first movement from right to left, Figs. 1 and 2. At the same time the batten 2 commences its forward movement and the vertical needles 23 commence their descent. By the time the batten has completed one-fourth of its forward movement the horizontal needle has completed its second movement from left to right, Figs. 2 and 3, and remains in this position until the beat up; but the vertical needle 23 before this second movement of the horizontal needle has descended far enough to engage the weft-thread 14, so that said thread is left in loop form in the auxiliary shed 1 and is there held by the vertical needle until after the lowering of the warps and the beat up. As the batten advances the vertical needle meets the fell of the fabric before the reed, and it consequently turns upon its pivot toward the reed, as indicated in Fig. 8, still, however, maintaining its engagement with the loop of weft 14 until the beat up, (see Fig. 3,) after which it rises and quits the loop. At this moment and before a fresh lift has been given to the warps the horizontal needle 12 is caused to complete its third movement from right to left, Figs. 3 and 4, which brings it into a position in which the right-hand end carrying the auxiliary-weft thread 15 is several millimeters from the left-hand edge of the warps of the inner selvage 27 of the right-hand fabric. An auxiliary shed 1 is now formed in this selvage, as indicated diagrammatically in Fig. 4, while the selvage 25 this time is shed in one with the body of the twin fabric and has no auxiliary shed 1. The ground-shuttle is thrown through the main shed, and simultaneously the fourth movement of the horizontal needle 12 from left to right, Figs. 4 and 5, takes place, thus carrying the auxiliary weft 15 through the shed 1 of selvage 27. At the same time the batten again moves forward, and the vertical needle 23 descends until it engages the thread 15, and then the fifth movement of the needle 12 from right to left, Figs. 5 and 6, takes place. The thread 15, however, is retained in the shed 1 of selvage 27 in loop form by the vertical needle, which operates as hereinbefore described and quits the loop only when the beat up takes place. It then rises and the sixth movement of the horizontal needle from left to right occurs, Figs. 6 and 1, which brings the horizontal needle 12 back into position to again lay a loop of weft 14 in selvage 25. Thus each one of the selvages 25 27 is truly edged every second beat up and no thread can unravel. The ground or shuttle weft 28 aids in keeping the supplemental or selvage-weft threads 14 and 15 firmly in the selvages 25 and 27, and if the apparatus is well regulated and the work performed with proper care the loops are concealed in the fabric and are invisible. The twin fabric thus obtained is divided after dyeing and dressing, the cut ends of the ground-weft threads 28 are singed, and the fabric appears to be really edged by the supplemental threads and does not unravel. Besides taffeta-selvages Gros de Tours selvages may be made or imitation pearled or other ribbon selvages can be produced.

The devices hereinbefore described may be used for obtaining other effects in weaving than selvages—as, for example, bands can be superimposed upon the body of a fabric by properly positioning the vertical and horizontal needles with reference to the same—and it is to be understood that this is included in the claims, and unless these bands are placed very close together a single horizontal needle can be used for each band, and it can be made to lay a loop of supplementary weft at each beat up of the ground-weft. This modification is shown diagrammatically in Figs. 10, 11, and 12, in which is represented the sequence of operations required to place two bands upon the body of a fabric, the bands being woven at the same time with the body of the fabric. The auxiliary sheds 30 are formed in the same way as the selvage-sheds 1, hereinbefore referred to. They are, however, located not at the edges of the body of the fabric, but between the edges. The auxiliary-weft threads (corresponding to the selvage-weft threads 14 and 15) are shown at 31. The horizontal needles are shown at 32. Each one of course will have associated with it a vertical loop-retaining needle; but it has been deemed unnecessary to represent the latter. The needles 32 are single needles, and at each pick they make one complete reciprocation, so as to lay a loop of auxiliary weft for each pick, which is beaten up at the same time with the ground-weft 28. In Fig. 10 the needles are shown as about to enter the auxiliary sheds, in Fig. 11 as having passed through the sheds to the far end of the stroke, and in Fig. 12 they are represented as having withdrawn therefrom to the position shown in Fig. 1, and the loops deposited by them are represented as having been beaten up with the body fabric. This sequence of movements takes place at each beat up of the reed, with the effect of superimposing bands upon the body fabric.

This invention is not limited to the use of any particular shuttle-loom, nor to the employment of any particular number or arrangement of needles, nor to the particular position of the needles, for the same result can be obtained by locating the reciprocating vertical needles point upward below the reed.

The apparatus hereinbefore described and illustrated has been designed more particularly with a view to its adaptation and convenient application to existing shuttle-looms; but novel looms working with shuttles and needles in accordance with the invention may be designed.

Having described the invention and the manner in which the same is or may be carried into effect, it, in conclusion, should be understood that the claims are not confined to the structural details hereinbefore described in illustration of the invention, for manifestly the same can be widely varied without departure therefrom; but

What is claimed as new and the invention of the said FRÉDÉRIC BARLET, deceased, is as follows:

1. In a shuttle-loom, and in combination with the means for weaving the body fabric, provisions for forming upon one of the lifts of the main or ground shed an auxiliary or supplemental shed, a needle mounted on and movable lengthwise of the lay and adapted to insert an auxiliary-weft thread into said supplemental shed, and a weft-loop-retaining needle also mounted on the lay and reciprocating thereon in a path transverse to that of the weft-inserting needle and adapted to yield toward the reed, substantially as and for the purposes hereinbefore set forth.

2. In a combined shuttle and needle loom substantially as described, the combination with the batten and the reed, of a double-ended horizontal weft-inserting needle adapted to receive an independent weft-thread at each end, said needle being mounted on and reciprocating lengthwise of the batten, and oscillating weft-loop-retaining needles mounted on the lay and reciprocable thereon in a path transverse to that of the double-ended horizontal needle, substantially as and for the purposes hereinbefore set forth.

In testimony whereof I have signed this specification in the presence of two subscribing witnesses.

WILLIAM T. P. HOLLINGSWORTH,
*Assignee of Frédéric Barlet, deceased.*

Witnesses:
ANNA F. FITZGERALD,
ALFRED T. V. SEAMANS.